(12) United States Patent
Vacanti (10) Patent No.: US 8,704,700 B2
(45) Date of Patent: Apr. 22, 2014

(54) PASSIVE BIRD-STRIKE AVOIDANCE SYSTEMS AND METHODS

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/308,435

(22) Filed: Nov. 30, 2011

(65) Prior Publication Data

US 2012/0200447 A1 Aug. 9, 2012

Related U.S. Application Data

(60) Provisional application No. 61/439,489, filed on Feb. 4, 2011.

(51) Int. Cl.
*G01S 13/00* (2006.01)
(52) U.S. Cl.
USPC .......................................................... 342/29
(58) Field of Classification Search
USPC .......................................................... 342/29
See application file for complete search history.

(56) References Cited

U.S. PATENT DOCUMENTS

| 5,134,410 A | | 7/1992 | Shrader | |
|---|---|---|---|---|
| 5,969,676 A | * | 10/1999 | Tran et al. | 342/442 |
| 8,279,109 B1 | * | 10/2012 | Piesinger | 342/43 |
| 2008/0062011 A1 | * | 3/2008 | Butler et al. | 340/961 |
| 2008/0111731 A1 | * | 5/2008 | Hubbard et al. | 342/160 |
| 2008/0150784 A1 | * | 6/2008 | Zhang et al. | 342/30 |
| 2011/0125349 A1 | | 5/2011 | Ace | |
| 2012/0001790 A1 | | 1/2012 | Edwards | |
| 2012/0101711 A1 | | 4/2012 | Furmston et al. | |

FOREIGN PATENT DOCUMENTS

| GB | 2176073 A | 12/1986 |
|---|---|---|
| JP | 60061669 A | 4/1985 |
| JP | 2005233763 A | 9/2005 |

OTHER PUBLICATIONS

Dr. Chujen Lin, Ultra-wideband collision avoidance sensor for UAV, Intelligent Automation, Inc., 2008, p. 1, http://www.i-a-i.com/view.asp?aid=251.
A.G. Huizing, et al., Compact Scalable Multifuction RF Payload for UAVs with FMCW Radar and ESM Functionality, Business Unit Observation Systems TNO Defence, Security and Safety, The Hague, The Netherlands, Radar Research Programme (V703) for the Netherlands Ministry of Defence, May 25, 2010.

* cited by examiner

*Primary Examiner* — Khoi Tran
*Assistant Examiner* — Harry Oh
(74) *Attorney, Agent, or Firm* — Shumaker & Sieffert, P.A.

(57) ABSTRACT

Systems and methods for providing passive bird-strike avoidance. A passive L-band receiver system is located on an aircraft. The system includes a processor and an antenna having an array of four or more elements. The antenna configured to receive L-band signals. The processor receives the L-band signals from the antenna, determines if the received L-band signals indicate a target, determines distance, direction of travel and speed of any determined targets, determines if the target is a flock of birds based on the determined speed and determines if a hazard condition exists based on the distance, direction and speed.

14 Claims, 7 Drawing Sheets

PASSIVE BIRD-STRIKE AVOIDANCE SYSTEMS AND METHODS

PRIORITY CLAIM

This application claims the benefit of U.S. Provisional Application Ser. No. 61/439,489, filed Feb. 4, 2011, which is hereby incorporated by reference.

BACKGROUND OF THE INVENTION

Commercial and business jets are frequently at risk of a bird strike when they are operating near coastal areas or "flyways" of bird migration routes. Bird strikes are exceptionally dangerous and have been known to cause serious damage to aircraft. The pilot is at risk of injury or death when birds strike the nose or windshield of an aircraft.

One solution now in place for avoiding bird strikes involves the use of fixed ground-based solid-state pulse compression radars placed in the airport environment. The radars observe the approach and path of flocks of birds that may encroach on airport approach and departure routes. Airborne solutions have also involved active radar systems that may compete with the existing weather radar and ILS navigation antennas in the nose of an aircraft. Thus, fully active radar is not financially or logistically viable.

SUMMARY OF THE INVENTION

The present invention provides systems and methods for providing passive bird-strike avoidance. A passive L-band receiver system is located on an aircraft. The system includes an antenna and a processor. The antenna has of an array of four or more elements configured to permit differential phase or time of arrival measurements. The antenna is configured to receive L-band signals. The processor receives the L-band signals from the antenna determines if the received L-band signals indicate a target, determines distance, direction of travel and speed of any determined targets, determines if the target is a flock of birds based on the determined speed and determines if a hazard condition exists based on the distance, direction and speed.

In one aspect of the invention, the processor determines if the hazard condition exists further based on position, heading and speed of the aircraft received from a positioning system. The processor receives a reference signal from one or more existing L-band transmitters on the aircraft.

In another aspect of the invention, the processor determines distance, direction of travel and speed of any determined targets by triangulating at two different points in time of the position of the target. The received L-band signal may also originate from another aircraft.

BRIEF DESCRIPTION OF THE DRAWINGS

Preferred and alternative embodiments of the present invention are described in detail below with reference to the following drawings:

FIGS. 6-1 and 6-2 are perspective views of a PBSAS package formed in accordance with an embodiment of the present invention.

DETAILED DESCRIPTION OF THE INVENTION

The present invention is a passive receive-only system that uses the normal transmissions of the traffic collision and avoidance system (TCAS) and transponder system to provide broad-area illumination of the entire hemisphere in front of an aircraft with no requirement for mechanical or electronic antenna scanning. A receiver uses a phase angle-of-arrival method, common to the TCAS system, to determine angle location of energy reflected from bird flocks. Range to the flock is determined by timing the flight of the aircraft's own TCAS or transponder L-band equipment pulses using the blanking signal, for example, as a reference. The range to the detected target may also be determined over a one second period via triangulation with two angle-of-arrival measurements when pulses received are not from the aircraft's own L-band equipment.

Figure 1:
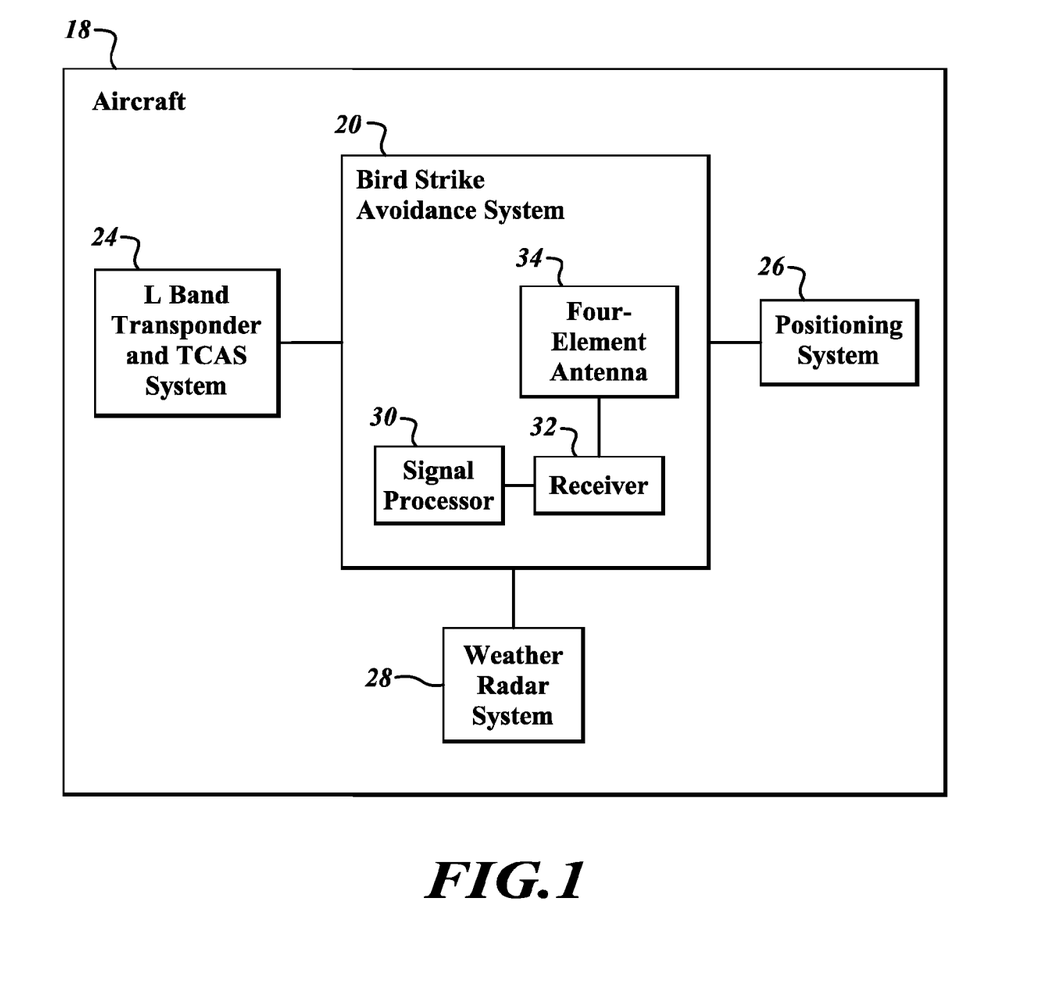
FIG. 1 is a block diagram of an exemplary system formed in accordance with an embodiment of the present invention.

As shown in FIG. 1, an exemplary passive bird-strike avoidance system (PBSAS) 20 includes a receiver 32, a signal processor 30, an antenna 34 having an array of four elements (more than four elements may be used), and a power supply (not shown) in a single active package that is placed on the pressure bulkhead inside the nose radome of an aircraft 18 to permit observation of the hemisphere in front of the aircraft 18 with the least impact to an already present weather radar system 28 and/or an instrument landing system (ILS) (not shown). The aircraft 18 also includes a positioning system 26 and an L-band transponder and TCAS system.

The PBSAS 20 provides angle-of-arrival and range-to-target information based on reflections of illumination provided by transmissions of the TCAS and transponder system 24. Ideally a "time zero" $T_o$ reference pulse is provided by a transmitter of the TCAS/transponder system 24 to the signal processor 30 via a hardwired connection. The receiver 32 and signal processor 30 directly measure range-to-target returns using the $T_o$ reference pulse.

The receiver 32 and the signal processor 30 identify pulses received (and reject others if desired) via a unique identifier encoded with received pulses. Alternatively, the receiver 32 and the signal processor 30 process "free illumination" from other transponders or TCAS transmissions by making only angle-of-arrival measurements and determining range to the target (flock) via successive angle measurements using aircraft motion (provided by the positioning system 26, an inertial navigation system (INS) (not shown), or a comparable device and then triangulating.

Figure 2:
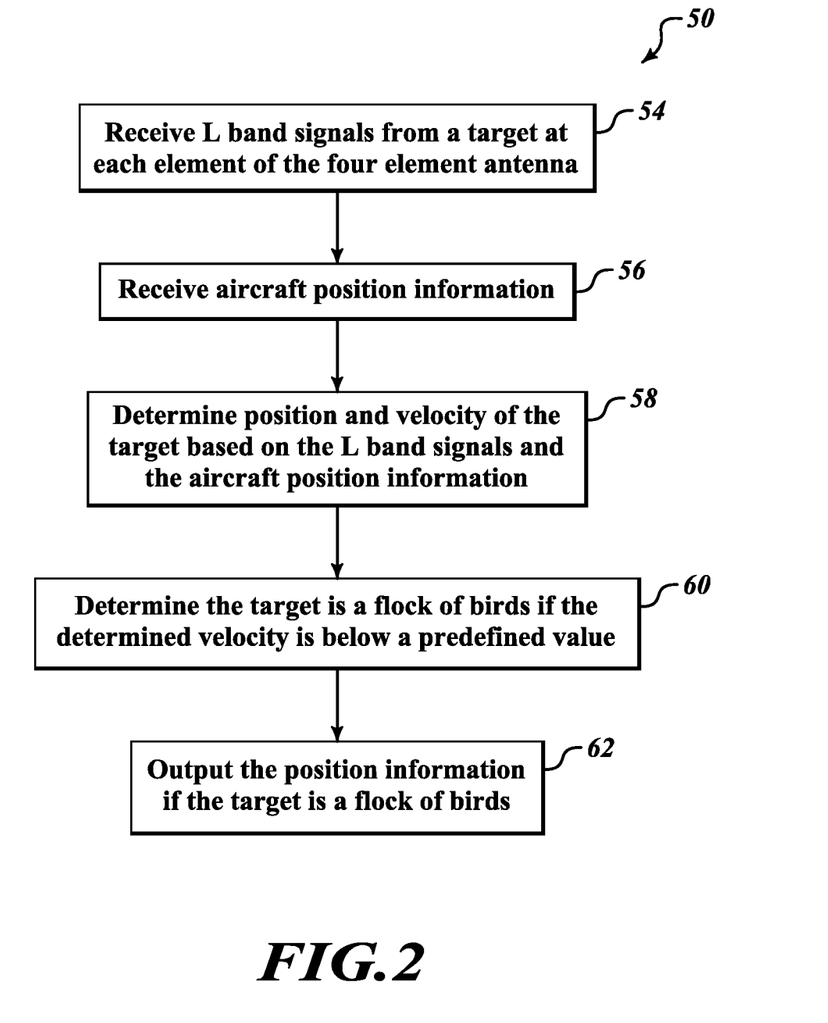
FIG. 2 is a flowchart of an exemplary process performed by the system shown in FIG. 1.

FIG. 2 illustrates an exemplary process 50 performed by the PBSAS 20. First, at a block 54, L-band signals reflected from a target are received at the elements of the antenna 34. Next, at a block 56, the PBSAS 20 receives aircraft position information from the positioning system 26 at a time associated with the reception of the L-band signals. Then, at a block 58, the signal processor 30 of the PBSAS 20 determines position and velocity of the target based on the received L-band signals and the aircraft position information. At a block 60, the signal processor 30 determines if the target is a flock of birds, if the determined velocity of the target is below a predefined value. Then, at a block 62, the signal processor 30 outputs the position information of the target if the target is determined to be a flock of birds.

In one embodiment, the position information is provided to the weather radar system 28, such as the IntuVue WXR by Honeywell, Inc., via an existing Ethernet input or comparable data connection (e.g., serial data link). The weather radar system 28 combines the detected location of a flock with weather (WXR) data and performs automatic space stabilization as the aircraft turns, climbs, etc. If a flight management system (FMS) generated flight path and identified flock indicate, as determined by the signal processor 30, that a bird-strike condition is about to exist, a warning icon is displayed on a display of the weather radar system 28 and an aural warning might sound if the threat was real and short term (below a threshold).

Figure 3:
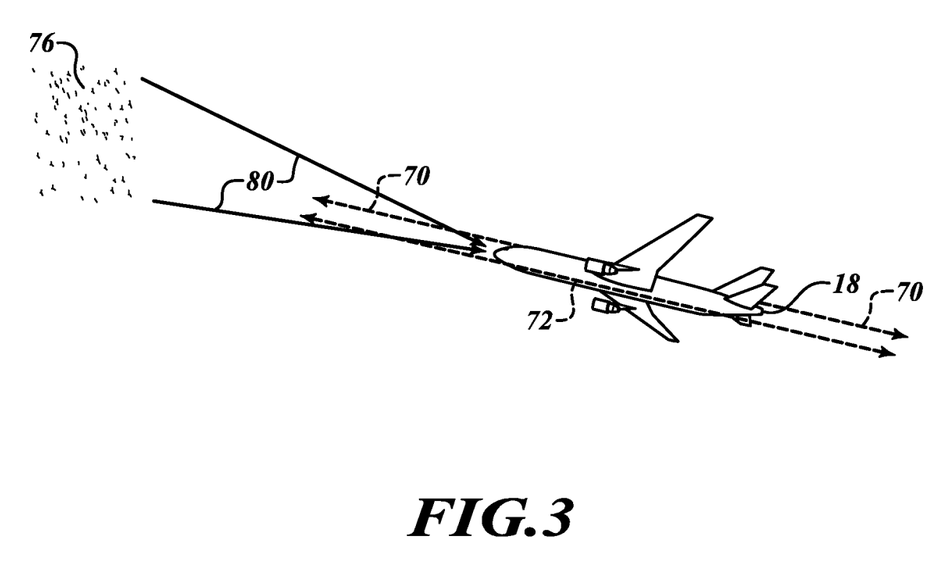
FIG. 3 is a perspective view of a flock of birds in proximity to an aircraft.

In one embodiment, bird flocks are illuminated by 1090- and 1030-MHz transmissions from own aircraft 18 and other nearby airborne aircraft. This transmission is an omnidirectional transmission, i.e., "All Call". FIG. 3 shows 1090- and/or 1030-MHz TCAS transmissions 70, 72 from top and bottom TCAS transmitters on the aircraft 18. A flock of birds 76 is illuminated by at least one of the transmissions 70, 72, thus reflecting a pulse 80 to the antenna 34 of the PBSAS 20.

Figure 4:
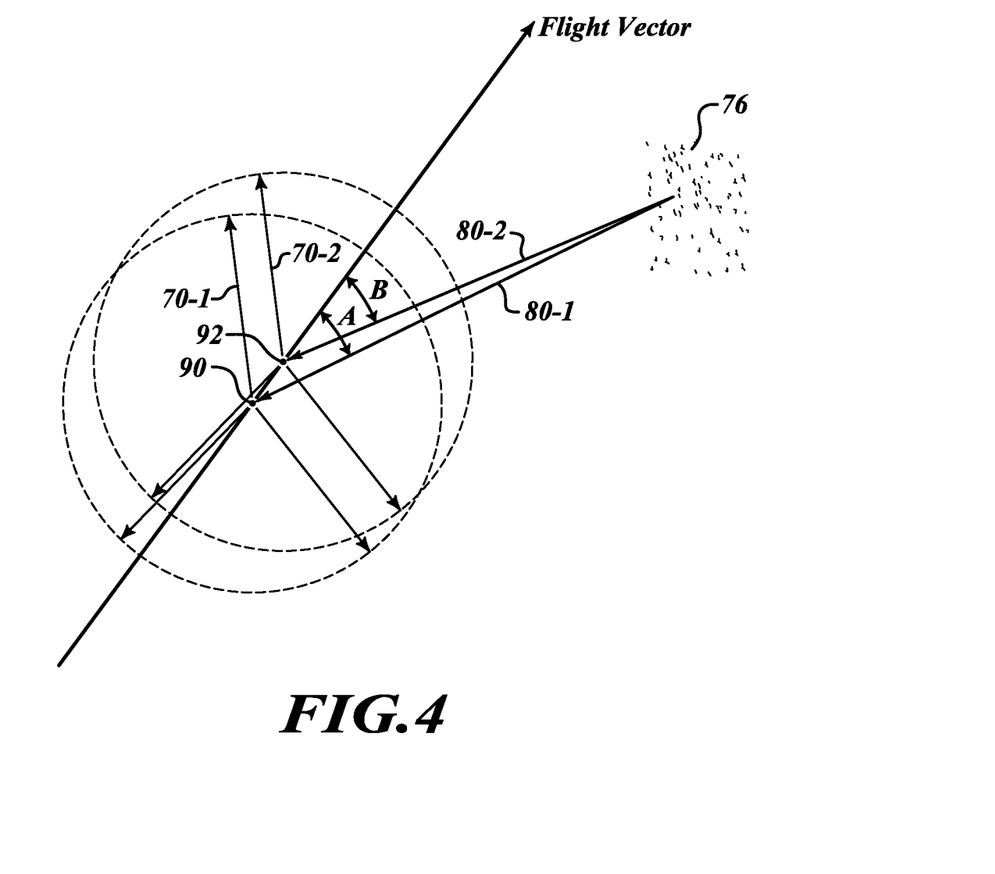
FIG. 4 illustrates a geometrical relationship between a flock of birds and an aircraft at two points in time.

When flock illumination is performed by other aircraft, the signal processor 30 performs range measurement via a triangulation method—see FIG. 4. A first reflected pulse is attained at aircraft position 90. Then at 0.2 to 1 second later a second reflected pulse is attained at aircraft position 92. Using the position information from a GPS (LAT, LON) or similar device, distance to the flock is determined using triangulation, because the distance between 90 and 92 is known and so are the AZ/EL of the reflected pulses. The signal processor 30 knows that these reflected pulses are from another aircraft because of an identifier (ID) modulated therein. The signal processor 30 determines that the reflected pulses are not coming directly from the other aircraft because the result of the triangulation shows that they are travelling at only a fraction of the distance that the source aircraft would be travelling.

If the pulse is from the aircraft 18 as determined by the ID within the received signal, then range measurement is determined via time of flight based on the L-band blanking pulse ($T_o$ reference pulse) received from the aircraft L-band transmitter(s). In one embodiment, the PBSAS 20 is connected to a combined AESS/ISS/L-band system.

Figure 5:
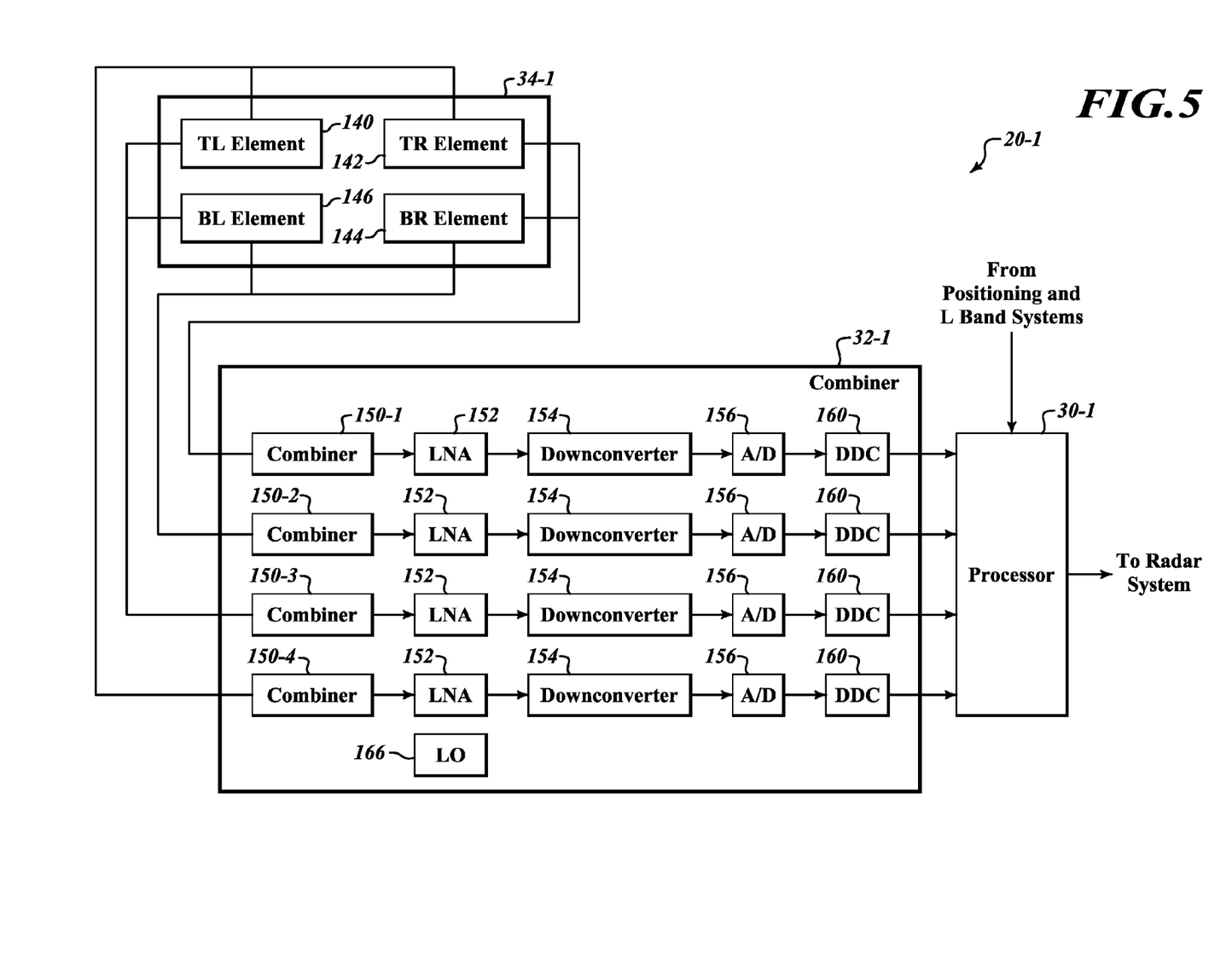
FIG. 5 is a block diagram of an exemplary passive bird-strike avoidance system (PBSAS) formed in accordance with an embodiment of the present invention.

FIG. 5 shows components of a PBSAS 20-1. An antenna 34-1 includes four elements 140-146—two rows of two. The signals (1030 and 1090 MHz) received by the elements 140-146 are selectively processed by receiver 32-1 and/or a signal processor 30-1 in order to produce an AZ or EL result using a phase comparison monopulse process (i.e., interferometric scheme). The antenna 34-1 includes four or more elements a top left (TL) element 140, a top right (TR) element 142, a bottom left (BL) element 146, and a bottom right (BR) element 144. The receiver 32-1 includes four subreceivers. The subreceivers all include the same components but are connected to the antenna elements in different manners. For example, the first subreceiver includes a combiner 150-1 that is coupled to the TR element 142 and BR element 144. The second subreceiver includes a combiner 150-2 that is coupled to the TL element 140 and the BL element 146. The third subreceiver includes a combiner 150-3 that is coupled to the TL element 140 and the TR element 142 and the fourth subreceiver includes a combiner 150-4 that is coupled to the BL element 146 and the BR element 144. Each of the combiners is connected to its own low-noise amplifier 2, which produces an output to a respective down-converter 154. The outputs of the down-converters 154 are converted to digital via respective analog-to-digital (A/D) converters 156. The digitized output of the A/D converters 156 is sent to a digital down-converter (DDC) 160 that digitally down-converts the digital output of the A/D converters 156 for input to the signal processor 30-1. The signal processor 30-1 analyzes the outputs of the DDCs 160, the position information received from the positioning system 26 and/or possible blanking time information or ID from the TCAS and transponder system 24. The signal processor 30-1 then generates position information of targets determined to be bird targets and sends that to the radar system 28. A local oscillator (LO) 166 provides an LO signal to the downconverters 154.

Figure 61:
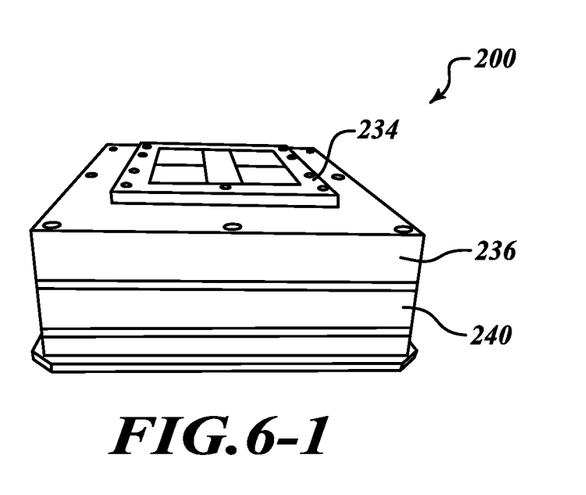
Figure 62:
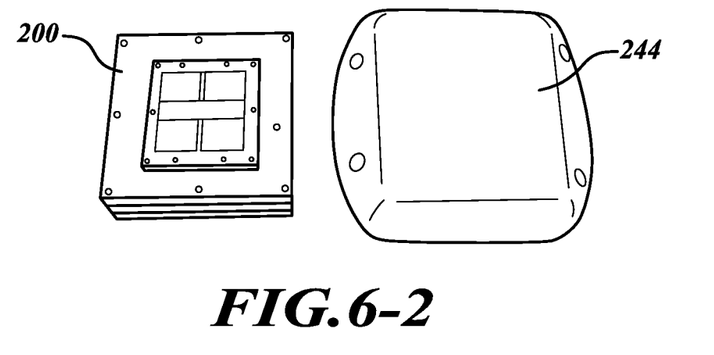

In one embodiment as shown in FIG. 6, a PBSAS package 200 is a package with microstrip antenna elements 234 located on a receiver section 32-1. The receiver section 236 is located on a signal processor and power supply section 240. The antenna elements 234 are covered by a radome 244.

Figure 7:
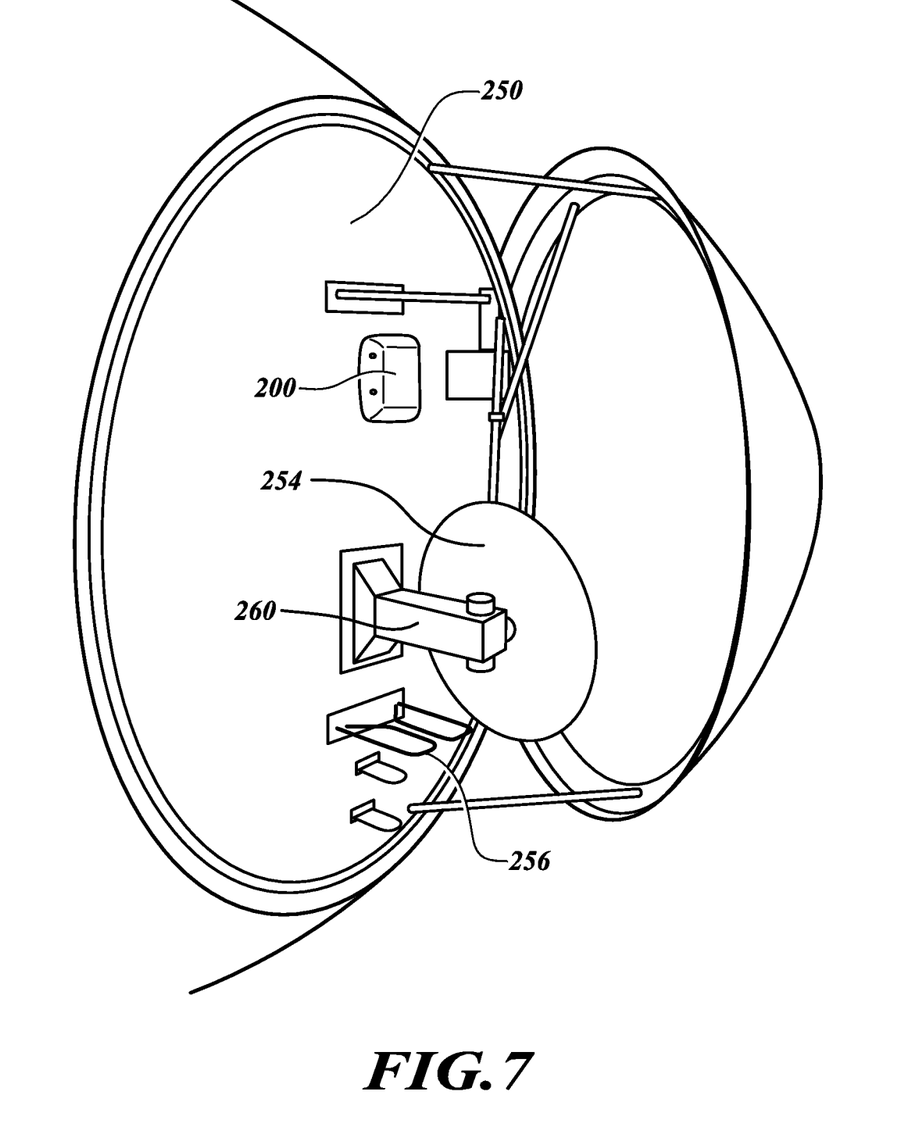
FIG. 7 is a perspective view of the PBSAS package of FIGS. 6-1 and 6-2 when mounted in a nose dome of an aircraft.

In one embodiment, the PBSAS package 200 is located at a top section of a forward pressure bulkhead 250 above a weather radar antenna 254 installation, if present (FIG. 7), and above an instrument landing system (ILS) antenna 256 if no weather radar antenna is present. Alternately, two PBSAS passive packages 200 are located on each side of a WXR antenna gimbal 260 in the radome when the location above the weather radar antenna 254 is occupied. The forward-looking PBSAS package 200 provides detection in the general direction of travel with wide field of view—greater than or equal to 60 degrees in azimuth and elevation.

In one embodiment, the flock location information generated by the PBSAS 20 may be supplied to a data bus for presentation on an enhanced ground proximity warning system (EGPWS) or traffic collision avoidance system (TCAS) displays.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A passive L-band receiver system, the system comprising:
   an antenna comprising an array of at least four elements, the elements being configured to receive reflected L-band signals; and
   a processor configured to:
   receive the L-band signals from the antenna;
   determine at least one target based on the received L-band signals;
   determine a distance, a direction of travel, and a speed of the at least one target;
   determine that the at least one target includes a flock of birds based on the speed of the at least one target; and
   determine if a bird-strike condition exists based on the distance, the direction of travel, and the speed of the at least one target and in response to the determination based on the speed of the at least one target that the at least one target includes the flock of birds.

2. The system of claim 1, further comprising an aircraft comprising the antenna, wherein the processor is further configured to receive a position, a heading, and a speed of the aircraft from a positioning system, wherein the processor is configured to determine if the bird-strike condition exists based on the position, the heading, and the speed of the aircraft.

3. The system of claim 2, wherein the processor is further configured to receive a reference signal from one or more L-band transmitters on the aircraft, and wherein the processor is configured to determine the at least one target based on the reference signal.

4. The system of claim 2, wherein the processor is further configured to determine the distance, the direction of travel, and the speed of the at least one target by triangulating a position of the at least one target at two different points in time.

5. The system of claim 1, further comprising;
an aircraft; and
a housing configured to house the antenna and the processor behind a radome of the aircraft.

6. The system of claim 5, wherein the housing is further configured to mount to a bulkhead of the aircraft and adjacent to a weather radar antenna of the aircraft.

7. A method comprising:
receiving L-band signals at four or more elements of an antenna;
receiving, at a processor, the L-band signals from the four or more elements of the antenna;
determining, at the processor, at least one target based on the received L-band signals;
determining, at the processor, a distance, a direction of travel, and a speed of the at least one target;
determining, at the processor, that the at least one target includes a flock of birds based on the determined speed of the at least one target; and
determining, at the processor, if a bird-strike condition exists based on the distance, the direction, and the speed of the at least one target and in response to determining based on the speed of the at least one target that the at least one target includes the flock of birds.

8. The method of claim 7, further comprising:
receiving, at the processor, a position, a heading, and a speed of an aircraft from a positioning system of the aircraft; and
determining, at the processor, if the bird-strike condition exists based further on the position, the heading, and the speed of the aircraft.

9. The method of claim 8, further comprising receiving, at the processor, a reference signal from one or more L-band transmitters on the aircraft, wherein determining the at least one target further comprises determining, at the processor, the at least one target based on the reference signal.

10. The method of claim 8, wherein determining the distance, the direction of travel, and the speed of the at least one target comprises triangulating a position of the at least one target at two different points in time.

11. The system of claim 4, further comprising an aircraft comprising the antenna, wherein the aircraft is a first aircraft, and wherein the processor is further configured to triangulate the position of the at least one target at two different points in time in response to determining that the L-band signals are associated with a second aircraft based on an identifier modulated within the L-band signals.

12. The system of claim 1, wherein the processor is configured to determine that the at least one target includes the flock of birds based on the speed of the at least one target by at least comparing the speed of the at least one target to a threshold and determining the at least one target includes the flock of birds in response to determining the speed of the at least one target is less than the threshold.

13. The method of claim 10, wherein the antenna is onboard an aircraft, and wherein triangulating the position of the at least one target at two different points in time is in response to determining, at the processor, that the L-band signals are associated with a second aircraft based on an identifier modulated within the L-band signals.

14. The system of claim 7, wherein determining that the at least one target includes the flock of birds comprises:
comparing the speed of the at least one target to a threshold; and
determining the at least one target includes the flock of birds in response to determining the speed of the at least one target is less than the threshold.

* * * * *